(12) United States Patent
Haberman (10) Patent No.: US 11,368,761 B2
(45) Date of Patent: Jun. 21, 2022

(54) SYSTEMS AND METHODS FOR MODIFYING COMMERCIALS

(71) Applicant: TIVO CORPORATION, San Jose, CA (US)

(72) Inventor: Seth Haberman, New York, NY (US)

(73) Assignee: TiVo Corporation, San Jose, CA (US)

( * ) Notice: Subject to any disclaimer, the term of this patent is extended or adjusted under 35 U.S.C. 154(b) by 0 days.

(21) Appl. No.: 16/519,857

(22) Filed: Jul. 23, 2019

(65) Prior Publication Data

US 2020/0196025 A1     Jun. 18, 2020

Related U.S. Application Data (63) Continuation of application No. 15/332,299, filed on Oct. 24, 2016, now Pat. No. 10,405,056, which is a (Continued)

(51) Int. Cl.
*H04N 21/6587* (2011.01)
*H04N 21/2387* (2011.01)
(Continued)

(52) U.S. Cl.
CPC ....... *H04N 21/6587* (2013.01); *G11B 27/005* (2013.01); *H04N 7/165* (2013.01);
(Continued)

(58) Field of Classification Search
None
See application file for complete search history.

(56) References Cited

U.S. PATENT DOCUMENTS 6,614,844 B1 *   9/2003   Proehl ................... H04N 5/445
                                                      348/E5.099
6,909,837 B1     6/2005   Unger
(Continued)

FOREIGN PATENT DOCUMENTS

JP     2003-289509 A     10/2003
JP     2004-094618 A      3/2004
(Continued)

OTHER PUBLICATIONS

International Search Report for PCT/US08/059324 dated Sep. 18, 2008.

*Primary Examiner* — Heather R Jones
(74) *Attorney, Agent, or Firm* — Haley Guiliano LLP

(57) ABSTRACT

Methods and apparatuses to deliver at least a portion of an advertisement to a viewer at normal playback speeds after receiving a command from the viewer to fast-forward through an advertisement faster than normal playback speeds are described. In one example, a portion of the advertisement may be delivered to be played at normal playback speeds, and the remaining portion may be delivered to be played at a playback speed that is faster than the specified playback speed so that the combination of the portions delivered at normal and faster playback speeds is delivered to the user at the specified playback speed. In another example, at least a portion of the first advertisement may be delivered at normal playback speeds, and one or more other advertisements may be delivered to the viewer simultaneously with the first advertisement with the audio information muted based on the specified playback speed.

20 Claims, 5 Drawing Sheets

THE FIRST COMMERCIAL WHEN FAST FOWARDED

Related U.S. Application Data continuation of application No. 14/497,260, filed on Sep. 25, 2014, now Pat. No. 9,479,842, which is a continuation of application No. 12/062,498, filed on Apr. 3, 2008, now Pat. No. 8,849,100.

(60) Provisional application No. 60/921,813, filed on Apr. 4, 2007.

(51) Int. Cl.
| | |
|---|---|
| *H04N 7/173* | (2011.01) |
| *H04N 21/432* | (2011.01) |
| *H04N 21/433* | (2011.01) |
| *H04N 21/44* | (2011.01) |
| *H04N 21/482* | (2011.01) |
| *H04N 21/81* | (2011.01) |
| *H04N 21/8355* | (2011.01) |
| *H04N 21/845* | (2011.01) |
| *H04N 21/854* | (2011.01) |
| *H04N 7/16* | (2011.01) |
| *G11B 27/00* | (2006.01) |
| *H04N 21/472* | (2011.01) |
| *H04N 21/431* | (2011.01) |
| *H04N 5/272* | (2006.01) |
| *H04N 21/47* | (2011.01) |

(52) U.S. Cl.
CPC ..... *H04N 7/17318* (2013.01); *H04N 21/2387* (2013.01); *H04N 21/4325* (2013.01); *H04N 21/4331* (2013.01); *H04N 21/44008* (2013.01); *H04N 21/4825* (2013.01); *H04N 21/812* (2013.01); *H04N 21/8113* (2013.01); *H04N 21/8355* (2013.01); *H04N 21/8456* (2013.01); *H04N 21/854* (2013.01); *H04N 5/2723* (2013.01); *H04N 21/4316* (2013.01); *H04N 21/47* (2013.01); *H04N 21/472* (2013.01)

(56) References Cited

U.S. PATENT DOCUMENTS

| | | | |
|---|---|---|---|
| 7,051,110 B2 * | 5/2006 | Hagai | H04N 7/17318 |
| | | | 348/E7.071 |
| 7,512,321 B2 * | 3/2009 | Tsuru | H04N 5/76 |
| | | | 386/239 |
| 7,676,142 B1 | 3/2010 | Hung | |
| 7,849,487 B1 * | 12/2010 | Vosseller | H04N 21/23439 |
| | | | 725/88 |
| 8,239,899 B2 | 8/2012 | Hagg | |
| 8,849,100 B2 | 9/2014 | Haberman | |
| 9,066,131 B1 | 6/2015 | Arsenault | |
| 9,479,842 B2 | 10/2016 | Haberman | |
| 2002/0104083 A1 | 8/2002 | Hendricks et al. | |
| 2002/0144262 A1 | 10/2002 | Plotnick et al. | |
| 2002/0191950 A1 | 12/2002 | Wang | |
| 2003/0154128 A1 | 8/2003 | Liga et al. | |
| 2003/0165084 A1 * | 9/2003 | Blair | H04N 5/783 |
| | | | 368/75 |
| 2003/0221191 A1 | 11/2003 | Khusheim | |
| 2004/0044570 A1 | 3/2004 | Aoyama | |
| 2004/0081428 A1 | 4/2004 | Funakoshi et al. | |
| 2004/0103429 A1 * | 5/2004 | Carlucci | H04N 21/812 |
| | | | 348/E5.002 |
| 2005/0076359 A1 | 4/2005 | Pierson et al. | |
| 2007/0179786 A1 | 8/2007 | Masaki et al. | |
| 2007/0248314 A1 * | 10/2007 | Iggulden | H04N 5/76 |
| | | | 386/228 |
| 2008/0115161 A1 | 5/2008 | Kurzion | |
| 2008/0124052 A1 | 5/2008 | Sardera | |
| 2008/0131075 A1 * | 6/2008 | Pontual | H04N 5/76 |
| | | | 386/343 |
| 2008/0152300 A1 | 6/2008 | Knee et al. | |
| 2008/0235087 A1 | 9/2008 | Amento et al. | |
| 2009/0300676 A1 | 12/2009 | Harter, Jr. | |

FOREIGN PATENT DOCUMENTS

| | | |
|---|---|---|
| JP | 2004-140723 A | 5/2004 |
| JP | 2005-006105 A | 1/2005 |
| JP | 2007-013359 A | 1/2007 |
| JP | 2007-518289 | 7/2007 |
| WO | 2005/034503 A2 | 4/2005 |

* cited by examiner

SYSTEMS AND METHODS FOR MODIFYING COMMERCIALS

CROSS-REFERENCE TO RELATED APPLICATIONS

This application is a continuation application of U.S. application Ser. No. 15/332,299, filed Oct. 24, 2016, which is a continuation application of U.S. application Ser. No. 14/497,260, filed Sep. 25, 2014, which is a continuation application of U.S. application Ser. No. 12/062,498, filed Apr. 3, 2008, which claims the benefit of U.S. Provisional Application No. 60/921,813, filed Apr. 4, 2007, all of which are incorporated herein in their entirety.

FIELD OF THE INVENTION

The present invention relates to the field of personal video recording systems. More particularly, the present invention relates to modifying commercials during fast-forward playback.

BACKGROUND OF THE INVENTION

In recent years, personal video records (PVRs), such as those manufactured by TiVo, Inc. and those built-in to set-top boxes provided by local cable companies, have become readily available to consumers. Using a hard drive or storage device and software, a PVR allows a television viewer to pause, rewind, fast forward, or playback a live television program that the viewer is watching. The PVR also allows the television viewer to record a program, where the recorded program will be stored on the PVR for future playback.

Figure 1A:
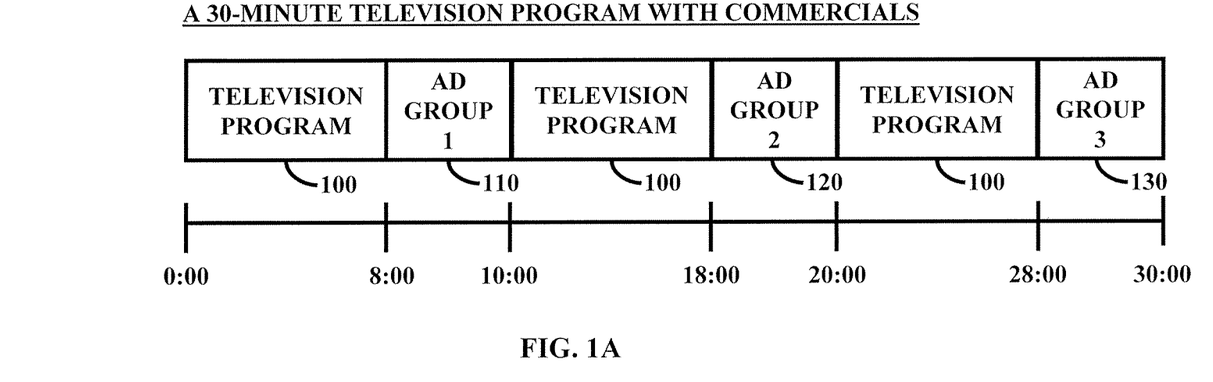
FIG. 1A is a schematic diagram showing a thirty-minute television program with commercial breaks.
Figure 1B:
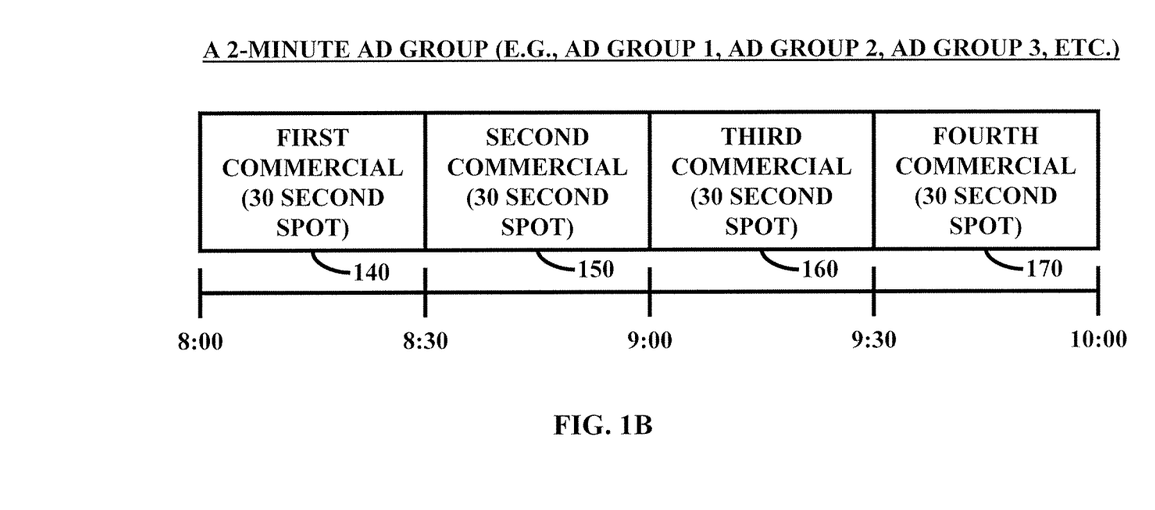
FIG. 1B is a schematic diagram showing a two-minute advertisement or commercial sequence that is provided during one of the commercial breaks.

In addition to recording television programs, the PVR also records the advertisements or commercials that are placed at given intervals during the broadcasted television programs. For example, as shown in FIG. 1A, a thirty-minute television program 100 may be divided into three eight-minute segments with three two-minute advertisement or commercial groups 110, 120. and 130. FIG. 1B shows that each two-minute advertisement or commercial group may include four thirty-second commercial spots 140, 150, 160, and 170 in succession.

However, the viewer that wishes to watch a program without interruption often considers these commercials a nuisance. Consequently, when the viewer plays back a recorded television program using the PVR, the viewer generally tends to fast forward through many or all of the commercials that were also recorded. Using the PVR, the viewer has the option of fast forwarding through these commercials at different rates—e.g., 2× speed in response to pressing the fast forward button once, 3× speed in response to pressing the fast forward button twice, and 4× speed in response to pressing the fast forward button three times. Generally, there is no audio playback when a viewer performs a fast forward operation. Thus, when fast forwarding through commercials, the commercials are muted, the video images are accelerated at the rate selected by the viewer, and the interruption to viewing the recorded program is minimized.

Accordingly, there exists a need for systems and methods that overcome these and other deficiencies in prior art systems.

For example, it would be desirable to allow viewers to fast forward through recorded video, such as a commercial, while still providing advertisers with an opportunity to present an advertising message.

BRIEF DESCRIPTION OF THE DRAWINGS

Various objects, features, and advantages of the present invention can be more fully appreciated with reference to the following detailed description of the invention when considered in connection with the following drawing, in which like reference numerals identify like elements.

DETAILED DESCRIPTION OF THE INVENTION

In accordance with the present invention, a commercial modification application (sometimes referred to herein as "the application") is provided. The application provides enhanced features for fast-forward playback through commercials while providing advertisers with an opportunity to present an advertising message in a space that would otherwise be skipped by viewers.

It should be noted that the application may be integrated with an interactive television application that provides interactive services to a viewer. Interactive services may allow a viewer to change channels, record one or more television programs, playback recorded programs, etc.

It should also be noted that although the following embodiments of the invention are described as relating to the playback of television program and media content from a personal video recorder, these embodiments are not limited only to playback of content on a personal video recorder. The application may be implemented on any suitable equipment, such as, for example, a set-top box, a digital video recorder (DVR), a computer, a configuration in which a DVR or PVR is integrated with a set-top box. etc. For example, the application may be implemented on a computer that is receiving streamed content. More specifically, the application may be embodied as a computer program product residing on one or more computer readable media, such a CD, DVD, hard drive, memory device, and the like, and instruct the related computer hardware (e.g., PVR. set-top box, TV, personal computer, etc.) to carry out the functions described herein. As illustrated above, the term "computer" will generally refer to devices/equipments/hardware having at least a microprocessor and a computer readable media that is capable of delivering one or more advertisements to a viewer.

The equipment may receive instructions from the viewer by any suitable input device (e.g., a remote control, a keyboard, an on-screen approach, etc.). For example, instructions from a viewer may be received using a remote control that has multiple buttons, such as a fast-forward button, a rewind button, a play button, a record button, a pause button, a stop button, a skip commercial button, etc. The remote control allows the viewer to fast-forward and rewind at multiple speeds though television content.

Figure 2A:
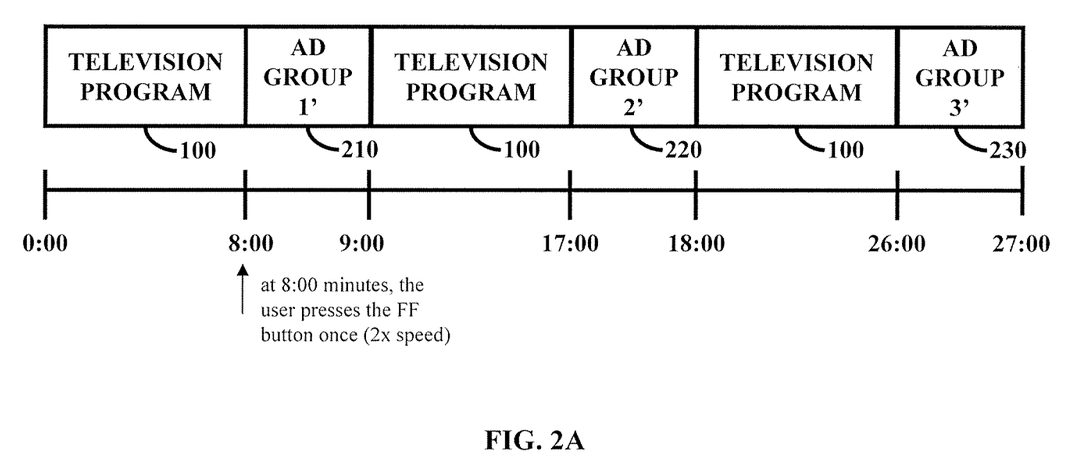
FIGS. 2A and 2B are illustrative schematic diagrams showing a modified commercial in response to a viewer action in accordance with some embodiments of the present invention.

As shown in FIG. 2A, the viewer is watching a television program. The television program may be a recorded program that is stored on the PVR. The television program may also be a live or broadcasted program that the viewer is currently tuned to and the PVR is concurrently storing the program as it is being broadcast in a local cache or other storage device.

The application is invoked in response to the viewer, for example, pressing the "fast-forward" button on the remote control once the television program is at the first commercial break or upon displaying the first commercial. Typically, such a viewer action causes the PVR to fast-forward through content (e.g., a television program, a commercial, etc.) at twice the playback. Instead, the application provides advertisers with an alternate approach for providing an advertising message.

In some embodiments, the application may detect when a commercial break occurs in the program sequence. In response to the viewer pressing the "fast-forward" button on the remote control during a commercial break, the application determines the length of the commercial, plays back a portion of the commercial in the initial playback speed (1×), and fast-forwards or increases the playback speed of the remainder of the commercial. It should be noted that the application determines the playback speed of the remainder of the commercial and compensates for the initial playback such that the commercial ends at the same time as if the viewer had pressed the fast-forward button on the remote control and fast-forwarded through the entire commercial (e.g., at 2× speed).

Figure 2B:
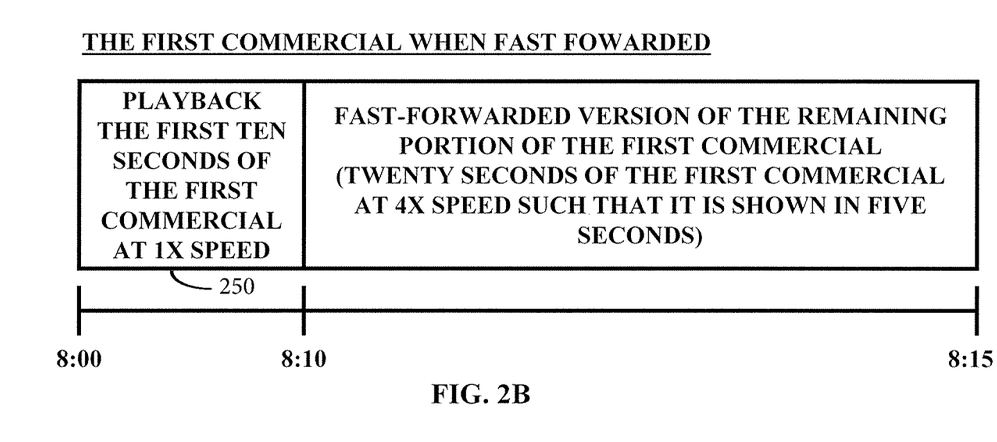

For example, as shown in FIGS. 2A and 2B, in response to pressing the fast-forward button once at the 8:00 minute mark of the television program, the application determines the length of the first commercial. Based on this determination, the application instructs the PVR to playback a portion of the first commercial. As shown in FIG. 2B, the application has determined that the first ten seconds of a thirty-second first commercial are to be shown (portion 250 of the first commercial). Upon providing the first ten seconds of the first commercial, the application may increase the playback speed of the remainder of the first commercial. As the viewer has pressed the fast-forward button once to instruct the PVR to fast-forward through the commercial at 2× speed, the application determines that a fast-forwarded thirty-second commercial is to be shown in fifteen seconds. Accordingly, the application increases the playback rate of the remaining twenty seconds of the first commercial so that it is shown in the remaining five seconds.

In another suitable embodiment, the application may divide up the commercial into different portions and playback each portion of the commercial at different rates. For example, a thirty-second commercial may be divided up into a five-second portion (the first portion), a twenty-second portion (the second portion), and five-second portion (the third portion). The first portion and the third portion are played back in the initial 1× speed and the playback rate of the second portion is increased such that the twenty-second portion is played back in five seconds (i.e., 4× speed). It should be noted that even though the first and third portions are played back at 1× speed, the playback of the entire commercial has not taken a longer time period than if the viewer fast-forwarded through the entire commercial at 2× speed.

In some embodiments, the application may divide up the commercial into different portions based on the playback speed the viewer has selected (e.g., 2× fast-forward, 3× fast-forward, 4× fast-forward). For example, if the viewer selects to fast-forward through a thirty-second commercial at a rate of 3× fast-forward, the application may playback the first ten seconds of the commercial in 1× speed and not playback the remainder of the commercial. Note that the first ten second portion of the commercial that is provided to the viewer has not taken a longer time period than if the viewer fast-forwarded through the entire commercial at 3× speed. In another example, the application may playback the first five seconds and increase the playback rate of the remaining twenty-five seconds of the commercial such that it is played back in five seconds (i.e., 5× speed).

It should also be noted that the invention is not limited to changing the rate of the playback of a commercial in response to a viewer action (e.g., pressing the fast-forward button on the remote control) at the start of a commercial break. The application may determine the playback rate of the commercial at any point that a viewer action is received. For example, if the viewer has watched three seconds of a thirty-second commercial and then presses the fast-forward button on the remote control, the application may determine a portion of the remainder of the commercial to playback at one rate (e.g., 1× speed) and another portion of the remainder of the commercial to playback at another rate (e.g., 5× speed, 10× speed, etc.).

It should also be noted that the application may then slow down, fade in, fade out, or any other suitable approach for transitioning to the start of the next commercial. The application may similarly playback a portion of the next commercial and then increase the playback rate of the remainder of the next commercial.

Using the application, the result will be a commercial that plays in a given time (e.g., five seconds, fifteen seconds, etc.) that satisfies the viewers' expectation but allows an initial period of time for a viewer to see if the viewer is interested.

Figure 3:
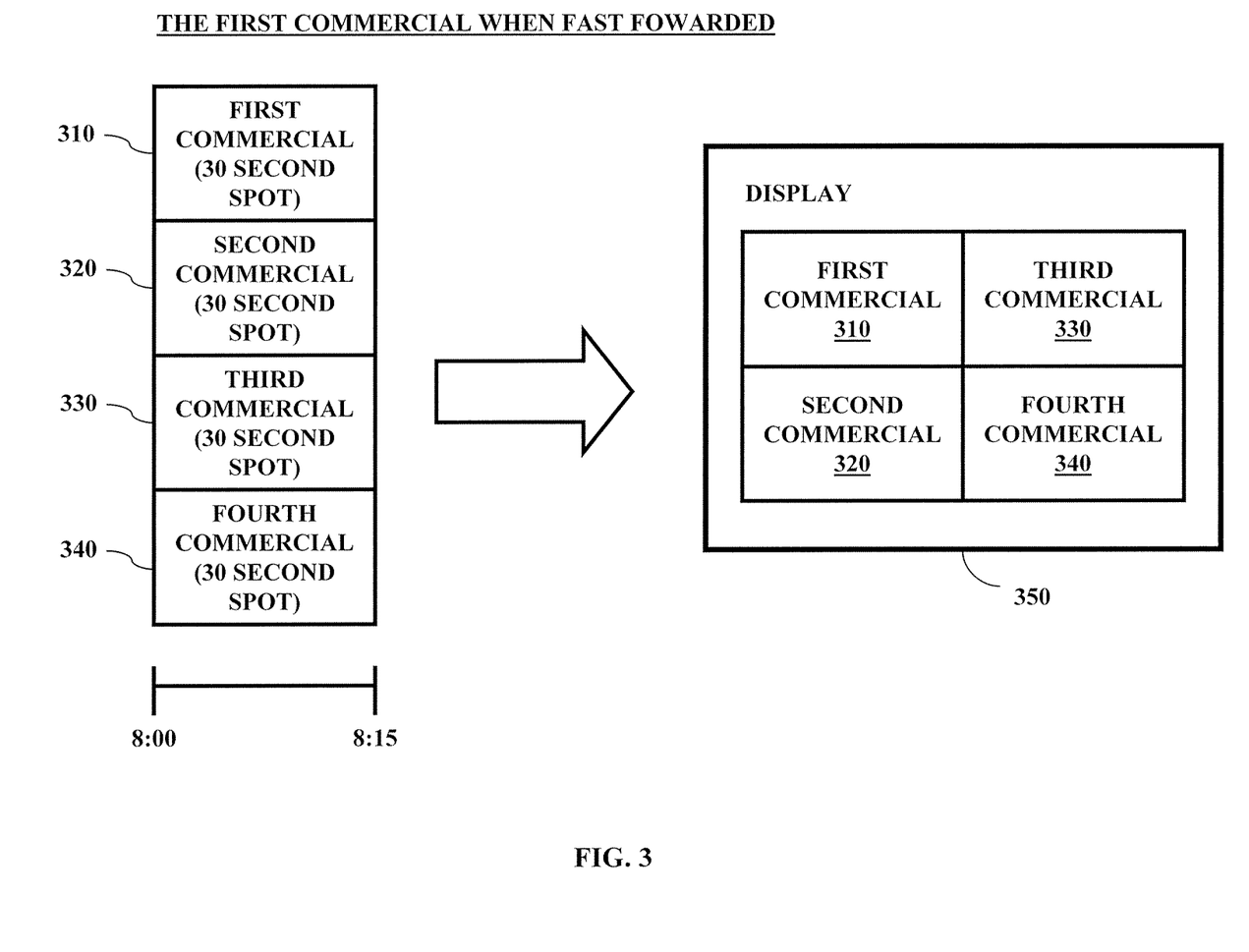
FIG. 3 is an illustrative schematic diagram showing multiple commercials that are simultaneously displayed in response to a viewer action in accordance with some embodiments of the present invention.

In some embodiments, the application may provide multiple commercials concurrently in response to the viewer pressing a fast-forward button on the remote control or other suitable input device during a commercial break. In response, the application may determine the number of commercials that are to be provided in a given commercial break. For example, as shown in FIG. 3, the application has determined that four commercials—i.e., a first commercial 310, a second commercial 320, a third commercial 330. and a fourth commercial 340—are to be played back during a given commercial break. The application may combine the content from the four commercials such that the four commercials are played back simultaneously (display 350).

In another suitable embodiment, the application may simultaneously display the first commercial and the second commercial and then simultaneously display the third commercial and the fourth commercial. In some embodiments, the application may determine the number of commercials to simultaneously display based on the playback rate selected by the viewer. For example, in response to the viewer selecting a playback rate of 2×, the application may simultaneously display two commercials (two thirty-second commercials displayed simultaneously in thirty seconds).

Figure 4:
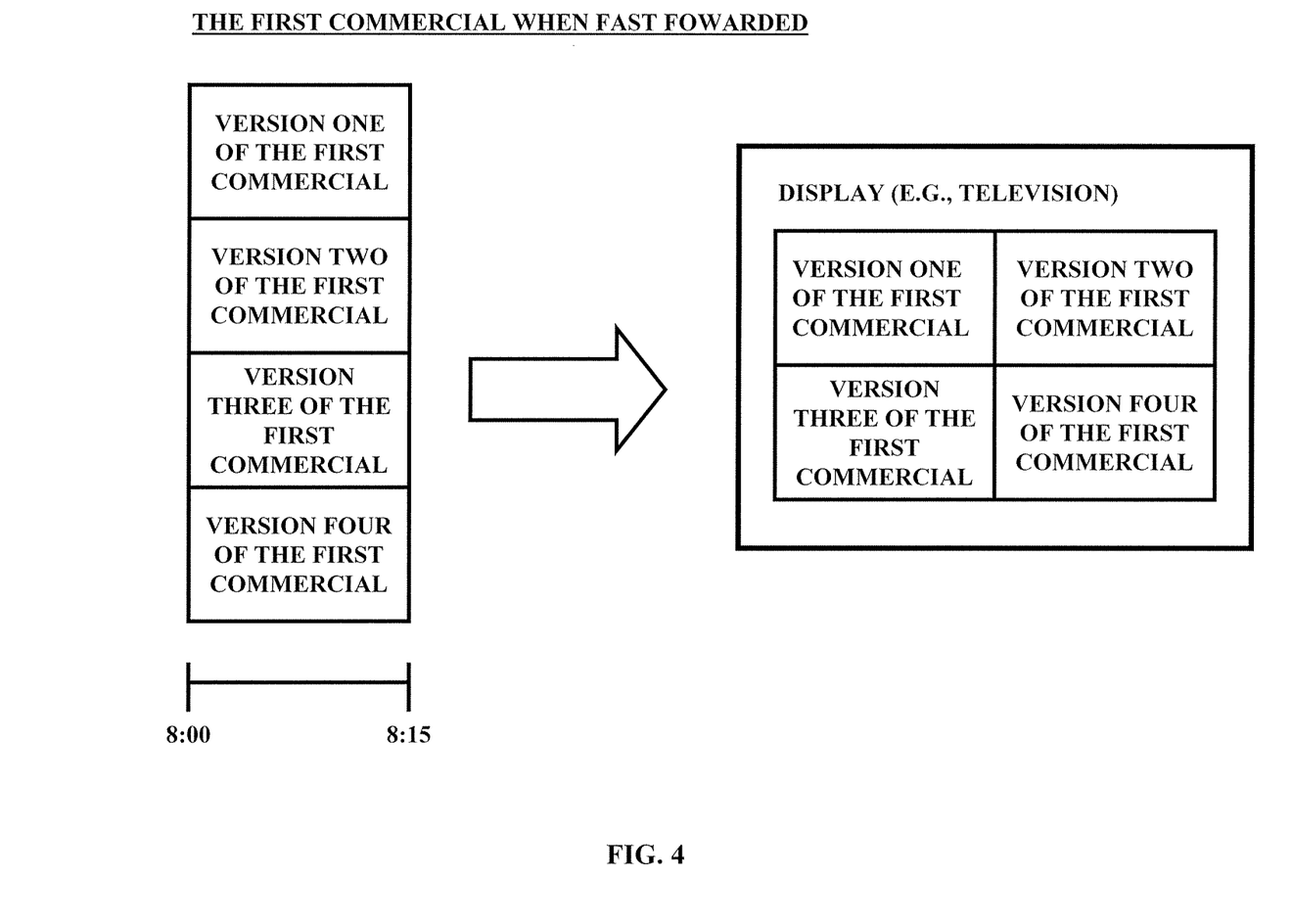
FIG. 4 is an illustrative schematic diagram showing multiple versions of a commercial that are simultaneously displayed in response to a viewer action in accordance with some embodiments of the present invention.

In some embodiments, the application may simultaneously display multiple versions of a commercial. For example, as shown in FIG. 4, in response to the receiving a viewer action (e.g., the viewer pressing the fast-forward or rewind button on a remote control), the application may provide multiple versions of the commercial to the viewer simultaneously. Each commercial may have a different media segments (e.g., portions of audio, portions of video, background audio, voiceovers, images, animations, graphics, ending, etc.).

In another example, the application may provide the viewer with multiple commercials from the same advertiser (e.g., each commercial is generated by Comcast). In yet another example, the application may provide the viewer with multiple commercials for the same product or service (e.g., each commercial relates to a particular Comcast service).

Figure 5:
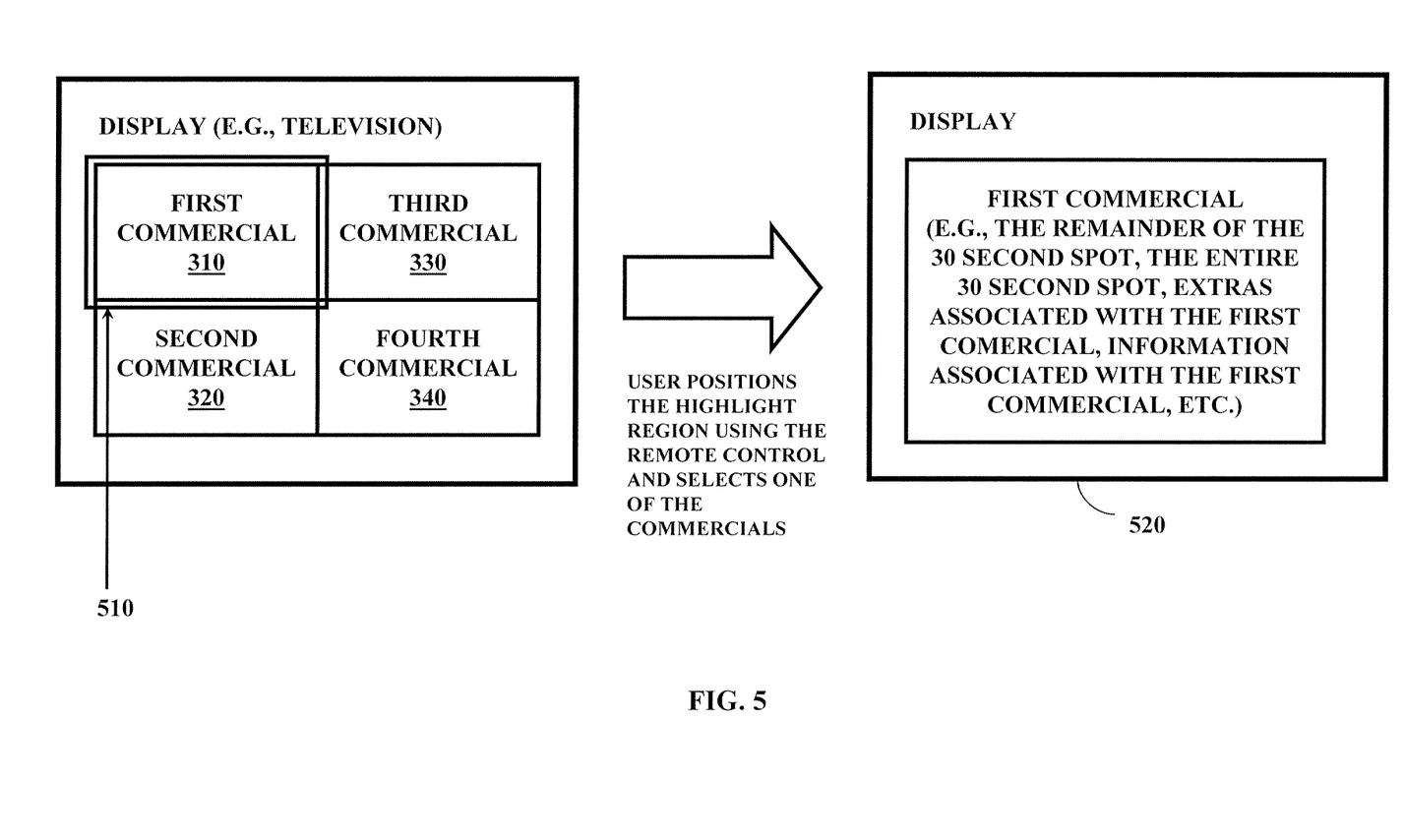
FIG. 5 is an illustrative schematic diagram showing a commercial that is being displayed in response to a viewer selection from multiple, simultaneously displayed commercials in accordance with some embodiments of the present invention.

In response to providing the viewer with multiple commercials simultaneously, the application may provide the audio track for one of the commercials. For example, the application may allow the viewer to place a highlight region 510 over one of the displayed commercials. As shown in FIG. 5, the highlight region 510 has been placed over first commercial 310. In response to the viewer selecting first commercial 310 by, for example, pressing a select button or other suitable interface, the application displays the first commercial to the viewer in display 520. The application may display the remainder of the first commercial, the entire first commercial (e.g., the thirty-second spot), the first commercial with additional content (e.g. coupon codes, personalized content, additional information associated with the selected commercial, etc.), etc.

In some embodiments, the application may provide the viewer with audio during the portions that are played back at a different rate (e.g., fast-forwarded or rewinded at 2×, 3×, 4×, 5×, 10×, etc.). With the advent of digital audio, it may be computationally expensive to recreate analog audio effects. In response to the application changing the playback rate for a portion of the commercial as described above, the application may retrieve the audio for that portion of the commercial and adjust the pitch of the audio. The application can play most of the words from the audio track, thereby removing a great deal of silence that normally occurs during fast-forward or rewind playback. Accordingly, the application can provide viewers with a significant portion of the audio track without having to prepare the audio track prior to playback.

In some embodiments, the application may provide the viewer with a complementary audio track that is particularly designated to be utilized for certain playback speeds. The complementary audio track may be the original audio track associated with the video (as described above) or can be a specialized audio track to be utilized for certain playback rates. For example, when a viewer fast forwards or rewinds a commercial (e.g. fast-forwarded or rewinded at 2×, 3×, 4×, 5×, 10×, etc.), the application may retrieve the complementary audio track for that portion of the commercial and playback the audio track, either in real-time or with the pitch of the audio adjusted. Different complementary audio tracks may be designated for different fast-forward and/or rewind rates. The application can play the complementary audio track, thereby-removing a great deal of silence that normally occurs during fast-forward or rewind playback.

In some embodiments, the application may provide the viewer with a commercial viewing option. In response to the receiving a viewer action (e.g., the viewer pressing the fast-forward or rewind button on a remote control), the application may provide the viewer with a selection of commercials. For example, in response to the viewer pressing the fast-forward button, the application may provide the user with a listing of commercials, a listing of brands, a listing of products and services, a listing of series of commercials, and/or any other suitable listing. The application may request that the viewer select and view one commercial or any other predetermined number of commercials prior to returning to the recorded content. For example, the application may prevent the viewer from fast-forwarding through the commercials and continuing to playback the program content until the viewer has selected one commercial to watch. In another example, the application, in a video-on-demand environment, may prompt the viewer to select from a list of commercials to view prior to downloading or viewing a selected video-on-demand program. In yet another example, the application, in a video-on-demand environment, may prompt the viewer to select from a list of commercials to download to the viewer's equipment (e.g., a set-top box) prior to downloading a selected video-on-demand program or prior to providing the viewer with a list of available video-on-demand programs.

In some embodiments, the application may provide the viewer with a commercial viewing option in response to the viewer hitting a rewind button on the remote control. In response to the viewer pressing the rewind button, the application may provide the user with a listing of commercials related to the commercial that the viewer watched. For example, when the viewer presses the rewind button after watching a Travel Channel commercial, the application may provide the viewer with a selectable list of Travel Channel commercials, where the list may include the commercial that the viewer viewed or a series of commercials relating to the recently viewed commercial. In another example, in response to pressing the rewind button after watching a Travel Channel commercial, the application may present the viewer with coupon codes relating to travel, the Travel Channel, sponsors of the Travel Channel, and/or advertisers on the Travel Channel. Alternatively, the application may provide the viewer with an option to view a different version of the commercial or a subsequent commercial in a series of commercials.

It should be noted that the application may include digital rights management features. For example, the advertiser may require that a predetermined amount of their advertisements be viewed at given speeds (e.g., 20% of their commercials must be viewed by at least 1× and 30% of their commercials must be viewed by at least 2×), at given portions of the screen (e.g., 10% of their commercials must be viewed in full size, 20% of their commercials must be viewed in at least split screen, etc.), etc.

In some embodiments, advertisers may set restrictions or parameters on each of their commercials. These parameters may be embedded within the commercial. For example, an advertiser may generate a commercial with the parameters that at least the first ten seconds must be viewed and that the commercial must be viewed in full screen. These parameter-embedded commercials may be transmitted to PVRs, where the processor of each PVR determines when a commercial is played back based on when the embedded parameters are met.

In some embodiments, the application may track and monitor the presentation of commercials to each PVR. For example, the application may monitor that the entire series of Travel Channel commercials were viewed in their entirety, ten seconds of a Verizon commercials was viewed, and one Comcast commercial was viewed in split screen with a Burger King commercial. The application may monitor each commercial in its varying speeds and presentations from each PVR and transmit this information to the operator of a database, where the database accounts for payments to and from advertisers.

As described hereinabove. the application provides enhanced features for modifying commercials while providing advertisers with an opportunity to present an advertising message in a space that would otherwise be skipped by viewers. One of ordinary skill would know how to utilize standard algorithms to implement the processes of the present invention based on the information provided in this application.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A method comprising:
receiving, from a computing device, a command requesting to fast-forward or rewind through a video content stream, that is being played back by the computing device at a first playback speed, to cause playback during a time duration at a second playback speed that is faster than the first playback speed;
determining, based on the second playback speed, a number of advertisements to simultaneously display during a portion of the video content stream corresponding to the fast-forward or rewind command;
sending, to the computing device and based on the command, at least the portion of the video content stream to cause playback at the second playback speed during the time duration;
selecting an audio track, from a plurality of stored audio tracks associated with the video content stream, corresponding to a third playback speed based on the second playback speed, wherein the third playback speed is slower than the second playback speed; and
sending, to the computing device and based on the command, the selected audio track to cause playback of the selected audio track at the third playback speed during the time duration while the video content stream is generated for playback at the second playback speed.

2. The method of claim 1, wherein the third playback speed adjusts a pitch associated with the audio to enable the audio to be played back during the time duration.

3. The method of claim 1, wherein the third playback speed adjusts a rate associated with the audio to enable the audio to be played back during the time duration.

4. The method of claim 1, wherein the third playback speed plays back the audio at a normal playback speed during the time duration.

5. The method of claim 1, further comprising:
sending, to the computing device, a second portion of the video content stream to cause playback of the video content stream at the third playback speed to enable playback of the portion and the second portion during the time duration.

6. The method of claim 1, wherein the portion comprises advertising video content, and wherein the audio comprises advertising audio content.

7. The method of claim 1, wherein the video content stream comprises information indicating a start of a segment associated with an advertisement and indicating the time duration.

8. A device comprising:
one or more processors; and
memory storing instructions that, when executed by the one or more processors, cause the device to:
receive, from a computing device, a command requesting to fast-forward or rewind through a video content stream, that is being played back by the computing device at a first playback speed, to cause playback during a time duration at a second playback speed that is faster than the first playback speed;
determine, based on the second playback speed, a number of advertisements to simultaneously display during a portion of the video content stream corresponding to the fast-forward or rewind command;
send, to the computing device and based on the command, at least the portion of the video content stream to cause playback at the second playback speed during the time duration;
select an audio track, from a plurality of stored audio tracks associated with the video content stream, corresponding to a third playback speed based on the second playback speed, wherein the third playback speed is slower than the second playback speed; and
send, to the computing device and based on the command, the selected audio track to cause playback of the selected audio track at the third playback speed during the time duration while the video content stream is generated for playback at the second playback speed.

9. The device of claim 8, wherein the third playback speed adjusts a pitch associated with the audio to enable the audio to be played back during the time duration.

10. The device of claim 8, wherein the third playback speed adjusts a rate associated with the audio to enable the audio to be played back during the time duration.

11. The device of claim 8, wherein the third playback speed plays back the audio at a normal playback speed during the time duration.

12. The device of claim 8, wherein the instructions, when executed by the one or more processors, further cause the device to:
sending, to the computing device, a second portion of the video content stream to cause playback of the video content stream at the third playback speed to enable playback of the portion and the second portion during the time duration.

13. The device of claim 8, wherein the portion comprises advertising video content, and wherein the audio comprises advertising audio content.

14. The device of claim 8, wherein the video content stream comprises information indicating a start of a segment associated with an advertisement and indicating the time duration.

15. A non-transitory computer-readable storage medium storing computer-readable instructions that, when executed by a processor, cause:
  receiving, from a computing device, a command requesting to fast-forward or rewind through a video content stream, that is being played back by the computing device at a first playback speed, to cause playback during a time duration at a second playback speed that is faster than the first playback speed;
  determining, based on the second playback speed, a number of advertisements to simultaneously display during a portion of the video content stream corresponding to the fast-forward or rewind command;
  sending, to the computing device and based on the command, at least the portion of the video content stream to cause playback at the second playback speed during the time duration;
  selecting an audio track, from a plurality of stored audio tracks associated with the video content stream, corresponding to a third playback speed based on the second playback speed, wherein the third playback speed is slower than the second playback speed; and
  sending, to the computing device and based on the command, the selected audio track to cause playback of the selected audio track at the third playback speed during the time duration while the video content stream is generated for playback at the second playback speed.

16. The non-transitory computer-readable storage medium of claim 15, wherein the third playback speed adjusts a pitch associated with the audio to enable the audio to be played back during the time duration.

17. The non-transitory computer-readable storage medium of claim 15, wherein the third playback speed adjusts a rate associated with the audio to enable the audio to be played back during the time duration.

18. The non-transitory computer-readable storage medium of claim 15, wherein the third playback speed plays back the audio at a normal playback speed during the time duration.

19. The non-transitory computer-readable storage medium of claim 15, wherein the computer-readable instructions, when executed, further cause:
  sending, to the computing device, a second portion of the video content stream to cause playback of the video content stream at the third playback speed to enable playback of the portion and the second portion during the time duration.

20. The non-transitory computer-readable storage medium of claim 15, wherein the portion comprises advertising video content, and wherein the audio comprises advertising audio content.

* * * * *